(12) United States Patent
Story et al.

(10) Patent No.: US 8,572,272 B2
(45) Date of Patent: Oct. 29, 2013

(54) PERSONALIZED TIME-SHIFTED PROGRAMMING

(75) Inventors: Guy A. Story, New York, NY (US); Ajit Rajasekharan, East Brunswick, NJ (US); Timothy Mott, Ketchum, ID (US)

(73) Assignee: Audible, Inc., Newark, NJ (US)

( * ) Notice: Subject to any disclaimer, the term of this patent is extended or adjusted under 35 U.S.C. 154(b) by 443 days.

(21) Appl. No.: 12/894,735

(22) Filed: Sep. 30, 2010

(65) Prior Publication Data
US 2011/0016504 A1 Jan. 20, 2011

Related U.S. Application Data

(60) Division of application No. 09/892,211, filed on Jun. 25, 2001, now Pat. No. 7,895,288, and a continuation of application No. 09/082,490, filed on May 20, 1998, now Pat. No. 6,253,237.

(51) Int. Cl.
*G06F 15/16* (2006.01)
*H04N 7/173* (2011.01)

(52) U.S. Cl.
USPC ............................ 709/231; 725/87; 725/88

(58) Field of Classification Search
USPC ................ 386/343; 709/231; 725/87, 88, 102
See application file for complete search history.

(56) References Cited

U.S. PATENT DOCUMENTS

| | | |
|---|---|---|
| 3,763,330 A | 10/1973 | Fulwiler |
| 3,871,112 A | 3/1975 | Licitis |

(Continued)

FOREIGN PATENT DOCUMENTS

| | | |
|---|---|---|
| EP | 0128093 | 12/1984 |
| EP | 0302710 | 2/1989 |

(Continued)

OTHER PUBLICATIONS

"Be Listening Up: PC Today Features News Article on Information Highway", Media Corporation 76 PCT Today, Jan. 1985, 1 pg.

(Continued)

*Primary Examiner* — Aaron Strange
(74) *Attorney, Agent, or Firm* — Knobbe Martens Olson & Bear LLP

(57) ABSTRACT

A method and apparatus for personalized time-shifted programming. Digital content is retrieved, for example, from a digital library. Once retrieved, the content is stored locally, for example, on a personal computer. The locally stored content is transferred, in whole or in part, to a playback device that allows a user to listen to the content of the playback device. In one embodiment, the user may designate portions of a playback time provided by the playback device to various selections. For example, with a playback device that provides two hours of content, a user may wish to listen to one half hour of news, one half hour of a series and one hour of an book. Thus, the user may partition one quarter of playback time to each of news and the series and one half of the playback time to the book. In one embodiment, the present invention provides different automatic update techniques for the playback device that may be selected by the user based on how the content is to be used For example, the news portion may be one half hour of the most recent news available from a particular source. The series may be the most recent episode in the series, whether or not the user has listened to other stored episodes. The book portion may provide one hour of the book from the most recent stopping place each time the playback device is coupled to the library retrieval device.

28 Claims, 7 Drawing Sheets

(56) References Cited

U.S. PATENT DOCUMENTS

| | | |
|---|---|---|
| 4,159,417 A | 6/1979 | Rubincam |
| 4,266,243 A | 5/1981 | Shutterly |
| 4,393,277 A | 7/1983 | Besen et al. |
| 4,455,651 A | 6/1984 | Baran |
| 4,473,824 A | 9/1984 | Claytor |
| D276,626 S | 12/1984 | Lockwood |
| 4,490,810 A | 12/1984 | Hon |
| 4,499,568 A | 2/1985 | Gremillet |
| 4,545,023 A | 10/1985 | Mizzi |
| 4,575,621 A | 3/1986 | Dreifus |
| 4,591,974 A | 5/1986 | Dornbush et al. |
| 4,601,011 A | 7/1986 | Grynberg |
| 4,658,093 A | 4/1987 | Hellman |
| D289,777 S | 5/1987 | Thomas |
| 4,682,368 A | 7/1987 | Takahashi |
| 4,698,776 A | 10/1987 | Shibata |
| 4,725,977 A | 2/1988 | Izumi et al. |
| 4,772,873 A | 9/1988 | Duncan |
| 4,779,080 A | 10/1988 | Coughlin et al. |
| 4,788,543 A | 11/1988 | Rubin |
| 4,788,675 A | 11/1988 | Jones et al. |
| 4,791,565 A | 12/1988 | Dunham et al. |
| 4,851,931 A | 7/1989 | Parker et al. |
| 4,855,725 A | 8/1989 | Fernandez |
| 4,868,687 A * | 9/1989 | Penn et al. ........................ 360/13 |
| 4,885,725 A | 12/1989 | McCarthy et al. |
| 4,891,838 A | 1/1990 | Faber |
| 4,899,292 A | 2/1990 | Montagna et al. |
| D306,589 S | 3/1990 | Murayama |
| 4,916,441 A | 4/1990 | Gombrich |
| 4,924,378 A | 5/1990 | Hershey et al. |
| 4,937,863 A | 6/1990 | Robert et al. |
| 4,941,040 A | 7/1990 | Pocock et al. |
| 4,949,187 A | 8/1990 | Cohen |
| 4,989,179 A | 1/1991 | Simko |
| 5,008,872 A | 4/1991 | Tomoda et al. |
| 5,018,017 A | 5/1991 | Sasaki et al. |
| 5,042,070 A | 8/1991 | Linna et al. |
| 5,055,947 A | 10/1991 | Satoh |
| 5,065,258 A | 11/1991 | Warren et al. |
| 5,065,345 A | 11/1991 | Knowles et al. |
| 5,091,939 A | 2/1992 | Cole et al. |
| 5,091,942 A | 2/1992 | Dent |
| 5,099,422 A | 3/1992 | Foresman et al. |
| 5,115,508 A | 5/1992 | Hatta |
| 5,121,492 A | 6/1992 | Saville, III et al. |
| 5,126,990 A | 6/1992 | Efron et al. |
| 5,132,992 A | 7/1992 | Yurt et al. |
| 5,133,076 A | 7/1992 | Hawkins et al. |
| D330,544 S | 10/1992 | Kane |
| 5,153,729 A | 10/1992 | Saito |
| 5,159,182 A | 10/1992 | Eisele |
| 5,172,413 A | 12/1992 | Bradley et al. |
| 5,181,107 A | 1/1993 | Rhoades |
| 5,191,410 A | 3/1993 | McCalley et al. |
| 5,191,573 A | 3/1993 | Hair |
| 5,203,001 A | 4/1993 | Yanagiuchi et al. |
| 5,208,665 A | 5/1993 | McCalley et al. |
| 5,210,611 A | 5/1993 | Yee et al. |
| 5,221,838 A | 6/1993 | Gutman et al. |
| 5,226,080 A | 7/1993 | Cole et al. |
| 5,237,612 A | 8/1993 | Raith |
| D339,329 S | 9/1993 | Lacko |
| D339,554 S | 9/1993 | Davidson |
| 5,247,347 A | 9/1993 | Litteral et al. |
| 5,249,166 A | 9/1993 | Hamilton et al. |
| 5,251,909 A | 10/1993 | Reed et al. |
| 5,253,275 A | 10/1993 | Yurt et al. |
| 5,311,423 A | 5/1994 | Clark |
| 5,319,582 A | 6/1994 | Ma |
| 5,333,116 A | 7/1994 | Hawkins et al. |
| 5,355,302 A | 10/1994 | Martin et al. |
| 5,357,475 A | 10/1994 | Hasbun et al. |
| 5,359,698 A | 10/1994 | Goldberg et al. |
| 5,365,502 A | 11/1994 | Misono |
| 5,371,532 A | 12/1994 | Gerlman et al. |
| 5,371,551 A | 12/1994 | Logan et al. |
| 5,383,112 A | 1/1995 | Clark |
| 5,388,196 A | 2/1995 | Pajak et al. |
| 5,406,626 A | 4/1995 | Ryan |
| D358,364 S | 5/1995 | Siddoway |
| 5,420,690 A | 5/1995 | Koishi |
| 5,438,423 A | 8/1995 | Lynch et al. |
| 5,440,334 A | 8/1995 | Walters et al. |
| 5,440,336 A | 8/1995 | Buhro et al. |
| 5,442,389 A | 8/1995 | Blahut et al. |
| 5,442,390 A | 8/1995 | Hooper et al. |
| 5,442,789 A | 8/1995 | Baker et al. |
| 5,463,601 A | 10/1995 | Yanagisawa |
| 5,483,658 A | 1/1996 | Grube et al. |
| D366,874 S | 2/1996 | Robinson et al. |
| 5,491,774 A | 2/1996 | Norris et al. |
| 5,491,820 A | 2/1996 | Belove et al. |
| 5,493,677 A | 2/1996 | Balogh et al. |
| 5,499,221 A | 3/1996 | Ito et al. |
| 5,504,815 A | 4/1996 | Ryan et al. |
| 5,506,904 A | 4/1996 | Sheldrick et al. |
| 5,511,000 A | 4/1996 | Kaloi et al. |
| 5,511,122 A | 4/1996 | Atkinson |
| 5,513,260 A | 4/1996 | Ryan |
| D370,484 S | 6/1996 | Williamson et al. |
| 5,524,051 A | 6/1996 | Ryan |
| 5,539,658 A | 7/1996 | McCullough |
| 5,541,638 A | 7/1996 | Story |
| 5,550,863 A | 8/1996 | Yurt et al. |
| 5,553,143 A | 9/1996 | Ross et al. |
| 5,555,098 A | 9/1996 | Parulski |
| 5,557,541 A | 9/1996 | Schulhof et al. |
| 5,572,442 A | 11/1996 | Schulhof et al. |
| 5,574,787 A | 11/1996 | Ryan |
| 5,579,471 A | 11/1996 | Barber et al. |
| 5,586,186 A | 12/1996 | Yuval et al. |
| 5,590,195 A | 12/1996 | Ryan |
| 5,592,511 A | 1/1997 | Schoen et al. |
| 5,615,061 A | 3/1997 | Singh |
| 5,616,876 A | 4/1997 | Cluts |
| 5,619,247 A | 4/1997 | Russo |
| D379,456 S | 5/1997 | Osiecki |
| 5,629,980 A | 5/1997 | Stefik et al. |
| 5,630,121 A | 5/1997 | Braden-Harder et al. |
| 5,634,012 A | 5/1997 | Stefik et al. |
| 5,634,080 A | 5/1997 | Kikinis et al. |
| 5,636,276 A | 6/1997 | Brugger |
| 5,638,443 A | 6/1997 | Stefik et al. |
| 5,646,992 A | 7/1997 | Subler et al. |
| 5,646,997 A | 7/1997 | Barton |
| 5,659,613 A | 8/1997 | Copeland et al. |
| 5,664,228 A | 9/1997 | Mital |
| 5,669,283 A | 9/1997 | Iida et al. |
| 5,673,315 A | 9/1997 | Wolf |
| 5,673,316 A | 9/1997 | Auerbach et al. |
| 5,675,734 A | 10/1997 | Hair |
| 5,699,526 A | 12/1997 | Siefert |
| 5,715,403 A | 2/1998 | Stefik |
| 5,721,815 A | 2/1998 | Ottesen et al. |
| 5,721,827 A | 2/1998 | Logan et al. |
| 5,724,582 A | 3/1998 | Pelanek et al. |
| 5,727,156 A | 3/1998 | Herr-Hoyman et al. |
| 5,727,159 A | 3/1998 | Kikinis |
| 5,732,219 A | 3/1998 | Blumer et al. |
| 5,734,719 A | 3/1998 | Tsevdos et al. |
| 5,734,823 A | 3/1998 | Saigh et al. |
| 5,734,891 A | 3/1998 | Saigh |
| 5,737,308 A * | 4/1998 | Nakai et al. ............... 369/275.2 |
| 5,745,568 A | 4/1998 | O'Connor et al. |
| 5,745,879 A | 4/1998 | Wyman |
| 5,752,244 A | 5/1998 | Rose et al. |
| 5,757,907 A | 5/1998 | Cooper et al. |
| 5,758,069 A | 5/1998 | Olsen |
| 5,761,485 A | 6/1998 | Munyan |
| 5,769,269 A | 6/1998 | Peters |
| 5,781,723 A | 7/1998 | Yee et al. |
| 5,793,980 A | 8/1998 | Glaser et al. |
| 5,796,824 A | 8/1998 | Hasebe et al. |

(56) References Cited

U.S. PATENT DOCUMENTS

| | | | |
|---|---|---|---|
| 5,798,995 A * | 8/1998 | Fukushima et al. | 386/328 |
| 5,809,144 A | 9/1998 | Sirbu et al. | |
| 5,809,246 A | 9/1998 | Goldman | |
| 5,819,003 A * | 10/1998 | Hirayama et al. | 386/241 |
| 5,819,043 A | 10/1998 | Baugher et al. | |
| 5,825,883 A | 10/1998 | Archibald et al. | |
| 5,841,979 A | 11/1998 | Schulhof et al. | |
| 5,845,065 A | 12/1998 | Conte et al. | |
| 5,860,068 A | 1/1999 | Cook | |
| 5,881,225 A | 3/1999 | Worth | |
| 5,889,860 A | 3/1999 | Eller et al. | |
| 5,892,900 A | 4/1999 | Ginter et al. | |
| 5,893,162 A * | 4/1999 | Lau et al. | 711/153 |
| 5,909,581 A | 6/1999 | Park | |
| 5,910,987 A | 6/1999 | Ginter et al. | |
| 5,915,019 A | 6/1999 | Ginter et al. | |
| 5,917,912 A | 6/1999 | Ginter et al. | |
| 5,918,013 A | 6/1999 | Mighdoll et al. | |
| 5,920,861 A | 7/1999 | Hall et al. | |
| 5,926,624 A | 7/1999 | Katz et al. | |
| 5,928,330 A | 7/1999 | Goetz et al. | |
| D413,097 S | 8/1999 | Chang | |
| 5,931,901 A | 8/1999 | Wolfe et al. | |
| 5,933,498 A | 8/1999 | Schneck et al. | |
| 5,940,504 A | 8/1999 | Griswold | |
| 5,943,422 A | 8/1999 | Van Wie et al. | |
| 5,949,876 A | 9/1999 | Ginter et al. | |
| 5,963,916 A | 10/1999 | Kaplan | |
| 5,966,440 A | 10/1999 | Hair | |
| 5,969,283 A | 10/1999 | Looney et al. | |
| 5,970,252 A | 10/1999 | Buxton et al. | |
| 5,982,891 A | 11/1999 | Ginter et al. | |
| 5,991,402 A | 11/1999 | Jia et al. | |
| 5,999,698 A * | 12/1999 | Nakai et al. | 386/230 |
| 6,002,720 A | 12/1999 | Yurt et al. | |
| 6,005,938 A | 12/1999 | Banker et al. | |
| D419,956 S | 2/2000 | Lucaci et al. | |
| 6,026,368 A | 2/2000 | Brown et al. | |
| 6,028,936 A | 2/2000 | Hillis | |
| 6,044,471 A | 3/2000 | Colvin | |
| 6,067,562 A | 5/2000 | Goldman | |
| 6,088,450 A | 7/2000 | Davis et al. | |
| 6,112,181 A | 8/2000 | Shear et al. | |
| 6,138,119 A | 10/2000 | Hall et al. | |
| 6,141,693 A | 10/2000 | Perlman et al. | |
| 6,157,721 A | 12/2000 | Shear et al. | |
| 6,157,929 A | 12/2000 | Zamiska et al. | |
| 6,158,005 A | 12/2000 | Bharathan et al. | |
| 6,170,060 B1 | 1/2001 | Mott et al. | |
| 6,173,112 B1 | 1/2001 | Gruse et al. | |
| 6,182,126 B1 | 1/2001 | Nathan et al. | |
| 6,185,683 B1 | 2/2001 | Ginter et al. | |
| 6,226,618 B1 | 5/2001 | Downs | |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,253,237 B1 | 6/2001 | Story, Jr. et al. | |
| 6,275,897 B1 * | 8/2001 | Bachmat | 711/114 |
| 6,292,569 B1 | 9/2001 | Shear et al. | |
| 6,363,488 B1 | 3/2002 | Ginter et al. | |
| 6,385,596 B1 | 5/2002 | Wiser et al. | |
| 6,389,402 B1 | 5/2002 | Ginter et al. | |
| 6,389,541 B1 | 5/2002 | Patterson | |
| 6,427,140 B1 | 7/2002 | Ginter et al. | |
| 6,449,367 B2 | 9/2002 | Van Wie et al. | |
| 6,588,015 B1 * | 7/2003 | Eyer et al. | 725/89 |
| 6,637,029 B1 | 10/2003 | Maissel et al. | |
| 6,788,882 B1 | 9/2004 | Geer et al. | |
| 7,233,948 B1 | 6/2007 | Shamoon et al. | |
| 7,272,298 B1 | 9/2007 | Lang et al. | |

FOREIGN PATENT DOCUMENTS

| | | |
|---|---|---|
| FR | 2651352 | 3/1991 |
| KR | 100286008 | 1/2001 |
| WO | WO 87/04309 | 7/1987 |
| WO | WO 96/35987 | 11/1996 |

OTHER PUBLICATIONS

"Buying Music Over the Internet, Newbytes", http://drlink.mnis.net/cgi-bin/index.cg.N+Reynolds%2C+Pamela&U=preynolds&B=Rank, Jan. 1997.

AutoWeek, "Aural Hygiene", Nov. 14, p. 10.

Chang Goo Kang, "New Digital Multisignature Scheme in Electronic Contract Systems", Proceedings 1995 IEEE International Symposium on Information Theory, Whistler Conference Centre, Whistler, B.C. Canada Sep. 17-22, 1995, 2 pgs.

Chang, et al., "An Open-Systems Approach to Video on Demand", IEEE Communications Magazine, May 1994, pp. 68-79.

Cox, Meg, "Electronic Campus Technology Threatens to Shatter the World of College Textbooks", The Wall Street Journal, Jun. 1, 1993, 2 pgs.

D.M. Nessett, "Layering Central Authentication on Existing Distributed System Terminal Services", Security and Privacy, 989 IEEE Symposium, pp. 290-299.

Deloddere et al., "Interactive Video on Demand", IEEE Communications Magazine, May 994, pp. 82-88.

Desmedt et al., "Multi-Receiver/Multi-Sender Network Security: Efficient Authenticated Multicast/Feedback", Infocom '92, IEEE 1992, pp. 2045-2054.

Dvorak, Radka et al., "A Methodology for User Centered Link Structures for Textbook to Hypertext Conversion", IEEE 1992, pp. 619-628.

Electronic Entertainment, "Listen Up Audio System and Audio on Deman", Subscription service written-up, February, 1 pg.

Filles, John, Web-Review—Liquid Audio Fine Tunes Music on Demand, http://www.webreview.com/97/01/03/feature/index.htlm, Jan. 1997.

Fisher, Daniel, "Technology and You: This Little Computer Tries to be a Book", St. Louis Post-Dispatch, Jan. 4, 1995, 2 pgs.

Information Highway Media Corp., "Information Highway Media Corp. Retains Von Gehr International as Investment Banker", Oct. 13, 1994, 1 pg.

Information Highway Media Corp., "Listen-Up Audio System & Audio-On-Demand to Open New Infobahn On-Ramp", IHM-94001. F.9/19/94, 1pg.

Jones, R., "Baseband and Passband Transport Systems for Interactive Video Services", IEEE Communications Magazine, May 1994, pp. 90-101.

Kaplan, Marc, "IBM Cryptolopes, Super Distribution and Digital Rights Management", http//www.research/ibm.com/people/k/kaplan/crytolope-docs/crypap.html; Mar. 27, 2000, 9 pgs.

Kwo-Jean Farn et al., "An Authenticate Processing for the Information System in Industrial Technology Research Institute", Carnahan Conference on Security Technology, 1991 IEEE, pp. 59-67.

M. Cox, "Technology Threatens to Shatter the World of College Textbooks", The Wall Street Journal, Jun. 1, 1993, vol. LXXIV, No. 160, Dow Jones & Co Inc.

Microsoft Computer Dictionary (Microsoft Press 2nd ed.), 1994 pp. 188-213.

Nelson B. Heller & Associates, "Microtome to Deliver Publishers' Texts Electronically at Point of Purchase", The Heller Report, Oct. 1993, pp. 1 & 10, vol. IV, No. 12, Highland Park IL USA.

PC Today Feactures News on Information Highway Media Corp., "Be Listening Up", Jan. 1995, 1 pg.

Pobiak, Bernard C., "Adjustable Access Electronic Books", IEEE, 1992, pp. 90-94.

Popular Mechanics, Feb. 1995, "Read Me a Story", 1 pg.

Popular Science, Feb. 1995, "The Captive Audience Network", 1 pg.

Ramanathan et al., "Architectures for Personalized Multimedia", IEEE 1994, pp. 37-46.

(56) References Cited

OTHER PUBLICATIONS

Ramos, Tony, "Can you Digit? Making Book on Electronics Books", Collegestore Journal, Sep./Oct. 1992, 2 pgs.

Schulof, Nathan, "Silicon Valley Start-up to Create New On-Ramp to the Information Superhighway with its Listen-Up Audio System and Audio On-Demand Subscription Service", Information Highway Media Corp., Sep. 1994, 3 pgs.

T. Romas, "Making Book on Electronic Books", College Store Journal, Sep./Oct. 1992.

T. Steinert-Threlkeid, "Now, Data by Satellite", Inter@active Week.

Watanabe, Toyohide et al., "Visual Interface for Retrieve! of Electronic-formed Books", IEEE 993, pp. 692-695.

Ziegler, Bart, "IBM to Unveil Plan to Skip Disks, Send Software by Satellite", The Wall Street Journal, Nov. 1, 1994, 1 pg.

* cited by examiner

PERSONALIZED TIME-SHIFTED PROGRAMMING

CROSS-REFERENCE TO RELATED APPLICATIONS

This application is a divisional of and claims the benefit of priority to U.S. patent application Ser. No. 09/892,211, filed on Jun. 25, 2001, which is a continuation of U.S. patent application Ser. No. 09/082,490, filed on May 20, 1998, now U.S. Pat. No. 6,253,237. The entire content of these patent applications are incorporated herein by reference.

BACKGROUND OF THE INVENTION

1. Field of the Invention

The present invention relates generally to information playback systems. More specifically, the present invention relates to time shifting of media programming.

2. Description of the Related Art

Many forms of information available through many types of media are available for delayed playback. For example, video cassette recorders (VCRs), Laser Discs, and Digital Versatile Discs (DVDs) allow for time-shifting of audio/visual (AIV) programming. Audio playback systems include such devices as cassette tape players and compact disc (CD) players. Audio content stored and played back with these devices typically include music, audio books, recordings of radio programs or lectures, etc. Other media are available or will be available to for time-shifting of various types of programming.

One shortcoming of these prior art playback devices is general inflexibility. For example, the possibility of having selections distributed over several storage components. A single audio book or series of lectures may require multiple cassettes or CDs for complete audio coverage. Audio/visual programming, such as movies, may also require multiple storage components. Another shortcoming is that cassettes (video or audio) and optical media (CDs, DVDs, etc.) are typically not rewritten with new content when the user finishes the original content, which leads to a proliferation of storage media that the user must dispose of or store. While technology exists to rewrite over original material, there exists few opportunities to acquire and record new content to write over the original content purchased by the user.

The prior art also includes digital playback devices that store audio content in an rewritable memory, such as flash memory. Such devices may be used advantageously to acquire and use programming content, however, these devices are typically inflexible as to storage and use of the content. For example, a playback device may store a time-limited portion of particular audio content. The user may be required to listen to the complete portion before storing a subsequent portion of the audio content or a different selection. Prior art digital playback devices typically do not provide the ability to store multiple programming selections and use the selections at different rates. Therefore, what is needed is an improved playback device that provides personalized time-shifted programming.

SUMMARY OF THE INVENTION

A method and apparatus for personalized time-shifted programming in described.

Digital content is retrieved from a library and stored for subsequent playback. A subset of the content is stored in a playback device and is automatically selected to update consumed content according to a user's predetermined specifications.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION OF CERTAIN INVENTIVE EMBODIMENTS

Figure 1:
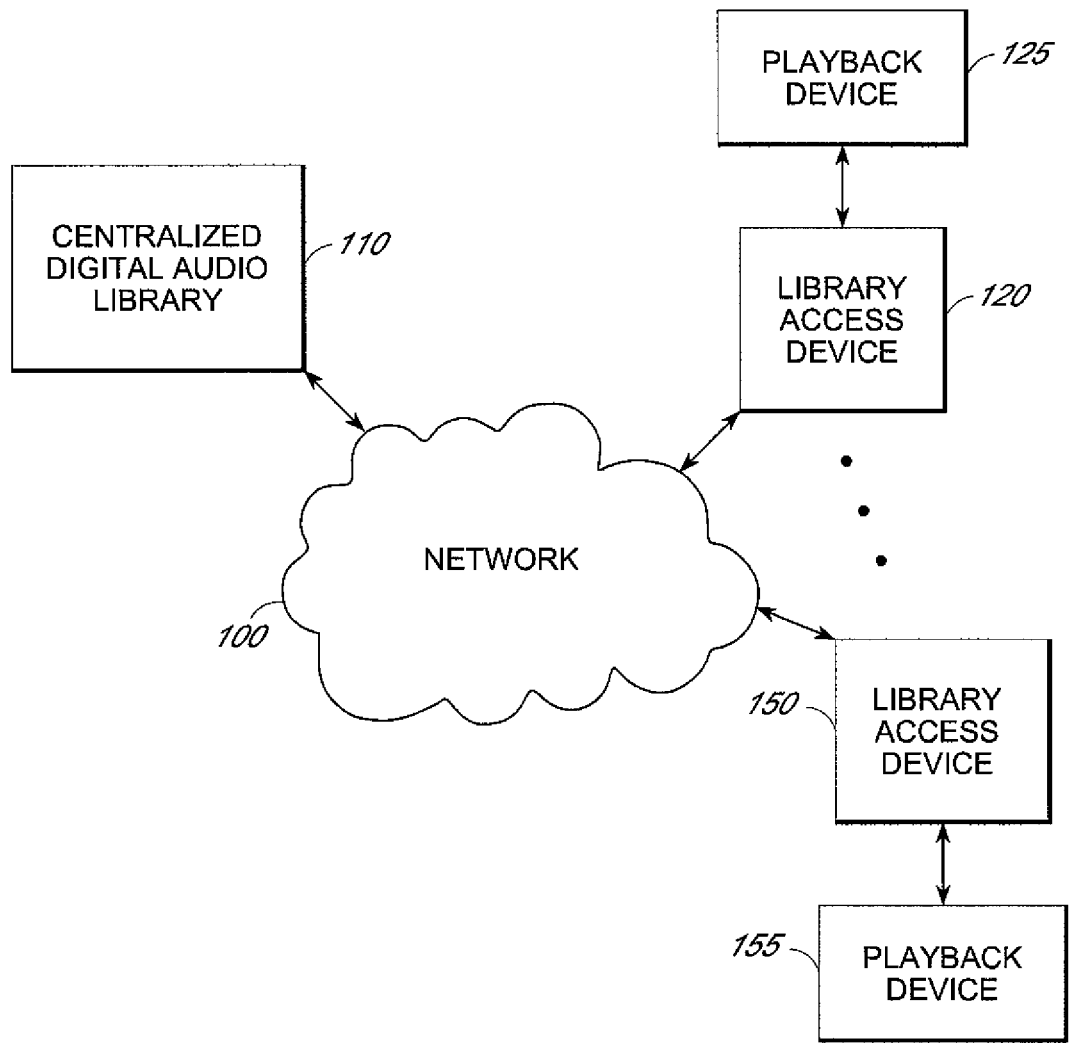
FIG. 1 is one embodiment of a block diagram of components for providing personalized time-shifted programming.

A method and apparatus for personalized time-shifted audio programming is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

While generally described in terms of digital audio programming, the present invention is not limited to personalizing and time-shifting of audio content. The present invention is equally applicable to other media, such as video, audio/video (NY), and other media or combinations of media. The present invention is used with a device having a limited storage resource, such as a fixed amount of onboard memory. The present invention allows a user to "consume" (by listening to audio content, watching video content, etc.) programming content and have the content updated automatically in a manner consistent with the user's consumption of the content. The present invention also allows a user to maintain multiple programming selections in a single storage device and to consume the multiple selections at different rates. The multiple programming selections may also be updated in different manners, depending on type of content, the user's preference, etc.

Briefly, in terms of audio content, the present invention provides a method and apparatus for retrieving audio content as well as time-shifting and personalization of playback. In one embodiment, digital audio content is retrieved, for example, from a digital audio library. Once retrieved, the audio content is stored, for example, on a personal computer or other storage device. The stored audio content is transferred, in whole or in part, to a playback device that allows a user to listen to the audio content on the playback device.

In one embodiment, the user may designate portions of a playback time provided by the playback device to various audio selections. For example, with a playback device that provides two hours of audio content, a user may wish to listen to one half hour of daily news, one half hour of a comedy series and one hour of an audio book. Thus, the user may partition one quarter of playback time to each of news and the comedy series and one half of the playback time to the audio book.

In one embodiment, the present invention provides different automatic update techniques for the playback device that may be selected by the user based on how the audio content is to be used. For example, the news portion may be one half hour of the most recent news available from a particular source. The comedy series may be the oldest non-consumed episode in the series. The audio book portion may provide one hour of the audio book from the most recent stopping place each time the playback device is coupled to the library retrieval device. Of course, other combinations and scenarios may also be implemented.

Overview of an Arrangement for Providing Personalized Programming Content

FIG. 1 is one embodiment of a block diagram of components for providing personalized time-shifted audio programming. While the embodiment of FIG. 1 is described in terms of personal computers, the Internet and Web servers the arrangement of FIG. 1 could also be provided with alternative components. The components of FIG. 1 may also be modified to provide personalized time-shifted programming for media other than audio.

Library 110 provides access to multiple audio products described generically as audio content, which includes one or more of the following: audio books, recorded radio programs, recorded lectures, audio newsletters and other periodicals, audio portions of television programming, messages or other communications from individuals, etc. Of course, other types of audio content may also be provided. Library 110 may be part of a larger digital library that includes video, text and other information not described with respect to the present invention.

Network 100 provides access to library 110. In one embodiment, network 100 is the Internet. In such an embodiment, library 110 may be presented to a user in the form of a World Wide Web (WWW, or Web) page. Alternatively, library 100 may be a different type of resource accessed via network 100, such as a bulletin board service (BBS), a file server, etc. Of course, network 100 may be a network other than the Internet, such as a local area network (LAN), a wide area network (WAN), a wireless network, or any other type of network.

Alternatively, library 110 may be a local storage device such as a DVD, a CD-ROM, etc. In such an embodiment, library 110 would not be accessed via network 100. Of course, programming content other than audio content may be retrieved by the library access devices.

Multiple library access devices, such as library access devices 120 and 150 may be coupled to network 100 to access library 110. Library access devices may be personal computers, dedicated library access devices or any other type of device that provides access to library 110 via network 100.

Coupled to each library access device is a playback device, such as playback devices 125 and 155. Playback devices store all or a portion of audio content accessed from library 110 for playback. In one embodiment, playback devices are portable devices that may be detached from an associated library access device by a user thereof. Alternatively, a playback device may be a component of an associated library access device and not readily separated therefrom.

Alternatively, a playback device may include library access functionality. For example, a Personal Digital Assistant (PDA) may include playback functionality as well as library access functionality. In such an embodiment, updates to audio content may be performed automatically by the PDA according to one of the methods described below.

Figure 2:
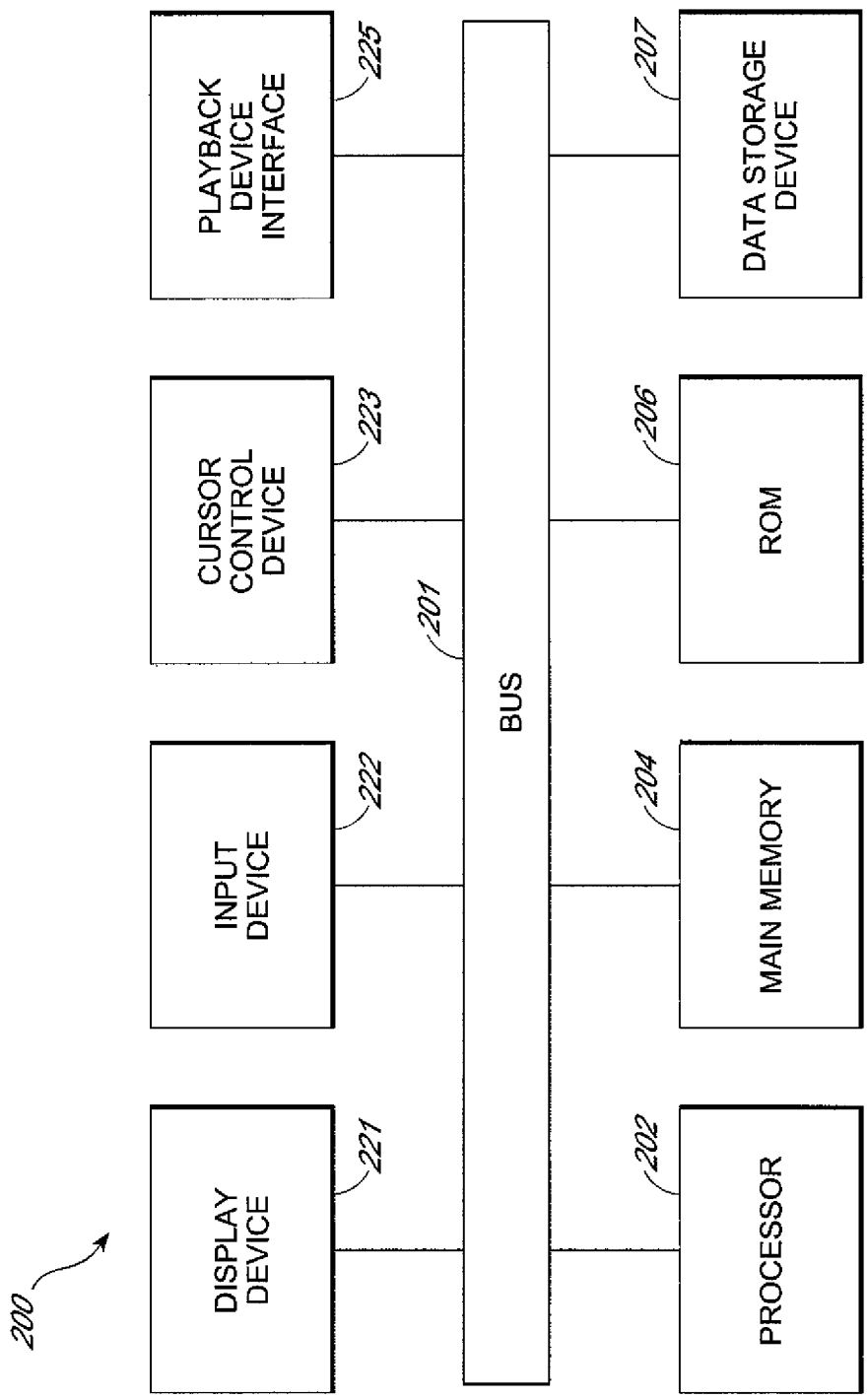
FIG. 2 is one embodiment of a computer system that may be used as a library access device.

FIG. 2 is one embodiment of a computer system that may be used as a library access device. Computer system 200 comprises bus 201 or other communication device for communicating information, and processor 202 coupled with bus 201 for processing information. Computer system 200 further comprises random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises read only memory (ROM) and/or other static storage device 206 coupled to bus 201 for storing static information and instructions for processor 202. Data storage device 207 is coupled to bus 201 for storing information and instructions.

Data storage device 207 such as a magnetic disk or optical disc and corresponding drive can be coupled to computer system 200.

Computer system 200 can also be coupled via bus 201 to display device 221, such as cathode ray tube (CRT) or liquid crystal display (LCD), for displaying information to a computer user. Alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221.

Computer system 200 may be coupled to a network, such as network 100 via a network interface, modem or other device (not shown in FIG. 2). Through the network interface, computer system 200 may be used to retrieve digital audio information from a library such as digital audio library 110. The audio content retrieved may be stored in main memory 204 and/or data storage device 207.

Playback device interface 225 provides an interface between computer system 200 and a mobile playback device (not shown in FIG. 2) described in greater detail below. Playback device interface 225 is used to transfer audio content from computer system 200 to the playback device and to receive information related to audio content from the playback device. Of course, playback device interface 225 may be used to transfer other data and/or to monitor audio content.

Alternatively, programming content may be updated directly to a playback storage device (not shown in FIG. 2), without the need for the playback device being directly coupled to the library access device. In such an embodiment, a removable storage device is coupled to playback device interface 225 to receive updated programming content. Thus, a user may have multiple storage device for use with a playback device, which would allow the user to continually use the playback device without the need for pausing to update programming content.

The present invention has been described in terms of "pulling" content from a library to a playback device or storage device. However, the concepts of the present invention are equally applicable to "pushing" of content from the library to the playback device or the storage device. The pushing of content may be performed in response to a particular user's specifications as to what content is desired and how the content should be stored and updated. Alternatively, content may be pushed randomly to users, or users to which content is pushed may be selected based on either revealed or observed preferences. Revealed preferences may be obtained through a registration or other process in which the user is asked a series of questions, or in another manner that obtains information from responses generated by a user. Observed preferences may be obtained by observing the types of content selected by a user. For example, sports content may be pushed to a user who has previously consumed other sports content.

Figure 3:
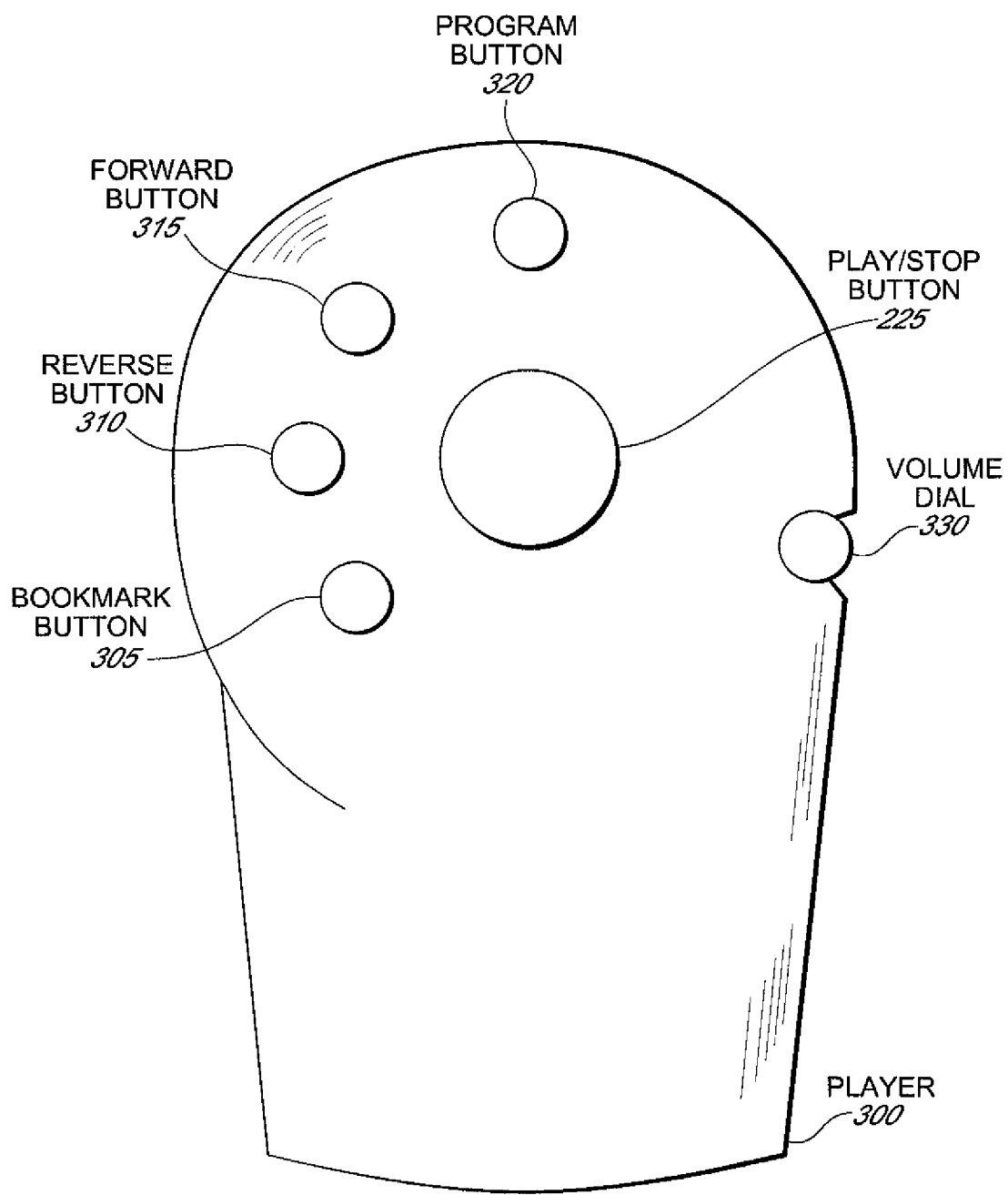
FIG. 3 is one embodiment of a playback device.

FIG. 3 is one embodiment of a playback device. Player 300 is a mobile playback device that allows digitized audio content to be downloaded, for example, via playback device interface 225 and replayed later. A user can utilize the buttons on player 300 to navigate through stored data to replay desired audio content.

Player 300 includes buttons 305, 310, 315, 320 and 325 and volume dial 330. Further details of player 300 can be found in U.S. patent application Ser. No. 08/710,114, filed Sep. 12, 1996.

In summary, player 300 includes a processor containing internal random access memory (RAM). External to the processor are conventional read only memory (ROM) and a memory storage device such as flash memory. The ROM contains the operating software, while the flash memory (or other memory storage device) contains audio data.

Player 300 can also include an interface to receive removable media that stores media content. For example, flash memory cards storing audio content can be inserted into player 300. Audio content stored on the removable media can be played back directly from the removable media or copied from the removable media and stored in player 300 for later playback.

Overview of Personalization and Time-Shifting of Audio Programming

In general, the present invention provides intelligent use of free and used memory in the playback device to provide seamless playback of programming content to the user. Furthermore, the present invention provides independent playback at different rates of various programming products, such as news programs, audio books, entertainment series, etc.

Figure 4:
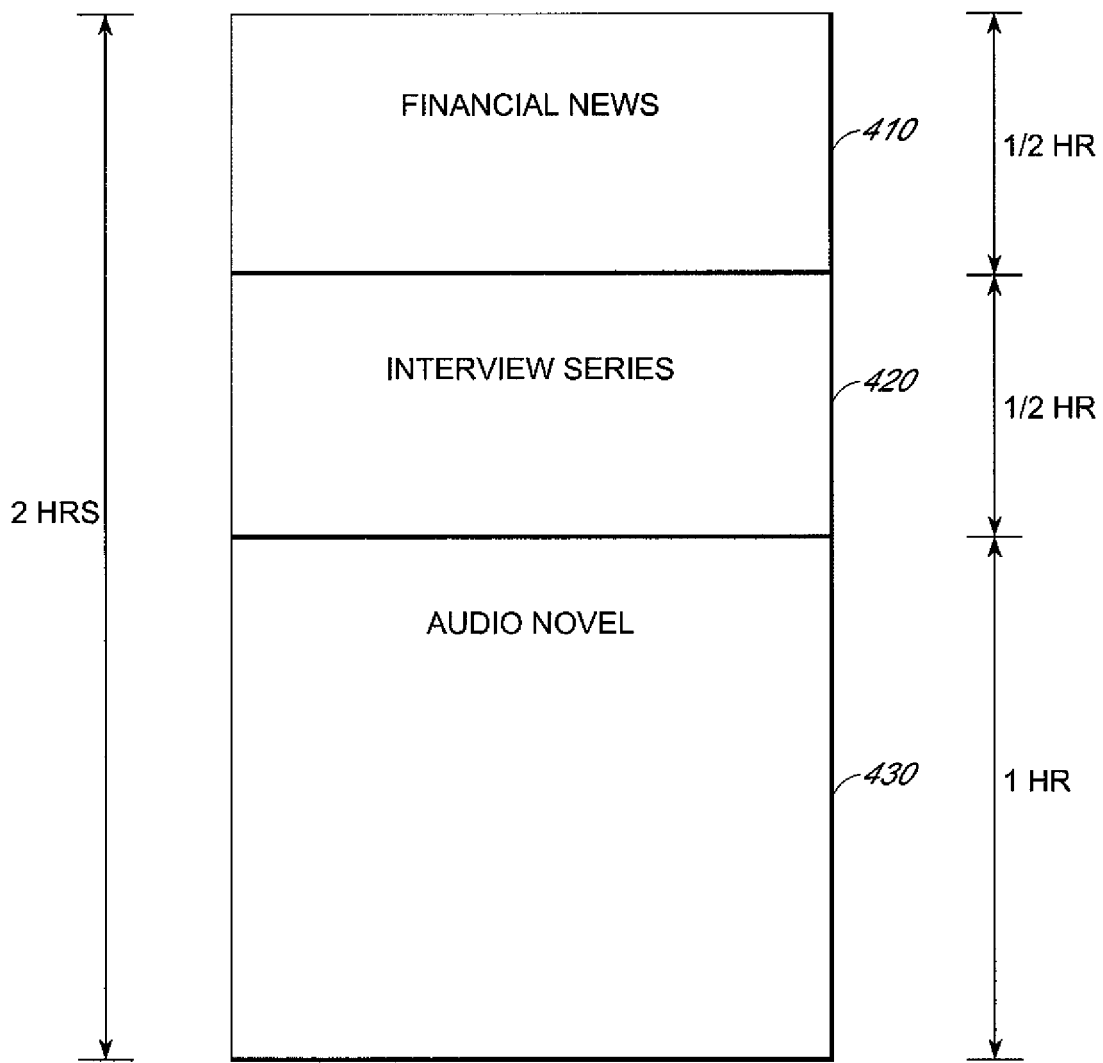
FIG. 4 is one embodiment of playback time allocation of audio content that may be provided.

FIG. 4 is one embodiment of an exemplary playback time allocation of audio content that may be provided. While the example of FIG. 4 is described in terms of audio programming, the storage and playback concepts apply equally to other types of programming, such as video, audio/visual, etc.

In the example, of FIG. 4 a two hour playback period is provided. The first half hour provides the latest financial news and the second half hour provides an episode from an interview series. The final hour provides an audio novel selected by the user. Of course, other playback lengths less than or greater than two hours may also be provided.

In one embodiment, the three audio selections described with respect to FIG. 4 are updated according to three different methods. Financial news portion 410 provides the most recent financial news available to the playback device. Interview series 420 provides an oldest non-consumed episode from a series of interviews. Audio novel 430 provides one hour of an unlistened to portion of a selected audio novel or the remainder of the audio novel, whichever is less. Of course, a different number of audio programs may be provided by a single playback device. Also, various combinations of one or more update methods may also be provided.

In one embodiment, unallocated playback time is used to expand designated playback times. For example, if a user allocates a half hour for a series and an hour for an audio book, the unallocated half hour can be used for the audio book. Alternatively, in the example of FIG. 4, if a subsequent interview episode is not yet available, the half hour designated for the interview series may be used for the audio book until the subsequent episode is available.

Figure 5:
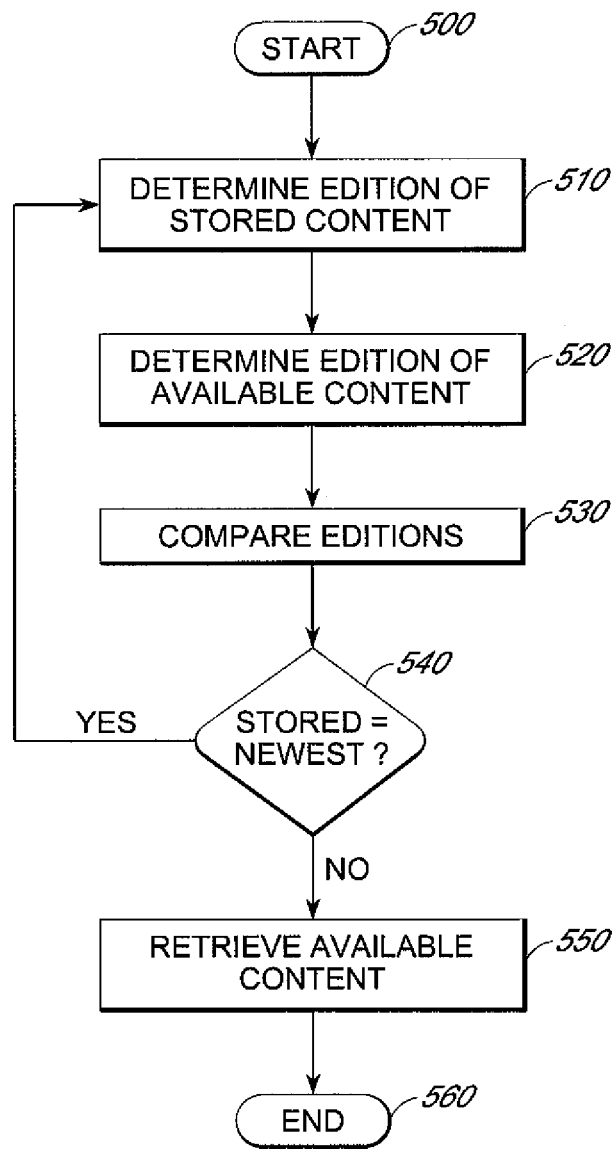
FIG. 5 is one embodiment of a flow diagram for automatically providing most recent audio content.

FIG. 5 is one embodiment of a flow diagram for automatically providing most recent audio content. The method for updating audio content described with respect to FIG. 5 may be used, for example, with audio content that changes frequently and the listener wishes to listen to the latest edition. Examples of such content include, but are not limited to, financial news, world news, sports scores, etc.

The steps of FIG. 5 may be performed, for example, by a computer system coupled to the Internet having access to a digital audio library. The computer system may automatically retrieve audio content for the playback device whether or not the playback device is currently coupled to the computer system.

The method of FIG. 5 starts at step 500. During step 500, a playback device mayor may not have an edition of the audio content desired. An edition of audio content is a segment of a larger audio content. For example, an interview series may be the audio content with each interview being an edition or episode of the series. If the playback device does not have any edition of the desired audio content, the most recent edition available is retrieved and stored.

If the playback device currently stores an edition of the desired audio content, the edition of the stored content is determined in step 510. In step 520 the edition of available content is determined. The editions determined in steps 510 and 520 are compared in step 530. It is important to note that steps 510 and 520 may be performed in reverse sequence, or steps 510 and 520 may be performed in parallel.

In step 540, it is determined whether the stored edition is the same as the most recent edition. If so, updating of the stored audio content is not required. Processing then returns to step 510 either immediately, or after a predetermined period of delay. If the stored content is not the most recent content, the most recent available content is retrieved and stored in step 550. At this point the desired most recent edition has been obtained and processing is completed in step 560.

The edition retrieved may be stored in the library access device or in the playback device. If stored in the library access device, all or a portion of the edition retrieved may be stored in the playback device at a later time.

Figure 6:
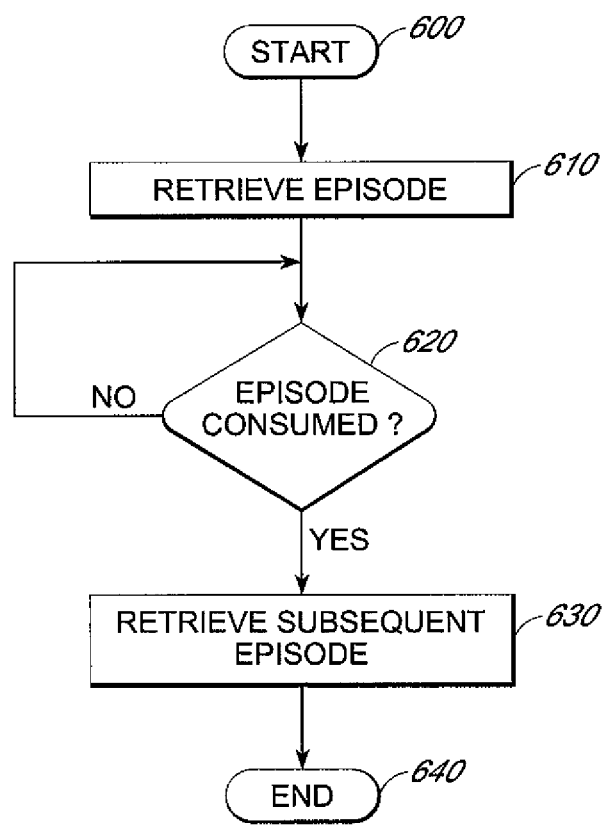
FIG. 6 is one embodiment of a flow diagram for automatically providing an episode in a series of episodes.

FIG. 6 is one embodiment of a flow diagram for automatically providing an episode in a series of episodes. The method of updating described with respect to FIG. 6 may be used, for example, when a user is interested in listening to a series and wishes to hear the most recent edition of the series.

As with the steps of FIG. 5 above, the steps of FIG. 6 may be performed, for example, by a computer system coupled to the Internet having access to a digital library. The computer system may automatically retrieve audio content for the playback device whether or not the playback device is currently coupled to the computer system.

The method starts with step 600. In step 610, an episode is retrieved from the digital library. In step 620, it is determined whether the retrieved episode has been consumed. Step 620 may be performed periodically, for example, at predetermined times, when the playback device is coupled to the library access device, etc. Alternatively, step 620 may be performed continuously until the retrieved episode is consumed.

In step 630, the subsequent episode in the series is retrieved. The subsequent episode retrieved in step 630 may be stored for later playback, for example, in the library access device or the playback device. Alternatively, the subsequent retrieved episode may be consumed immediately. The process concludes in step 640.

Of course, the steps described with respect to FIG. 6 may be modified to retrieve an edition from the series after the user has listened to the edition(s) already retrieved. Alternatively, new editions may be retrieved and stored by the library access device and stored in the playback device after an older edition has been used.

In an alternative embodiment, a portion of a subsequent episode can be stored in the memory allocated for the series. For example, if a user listens to 10 minutes of a 30 minute episode and has allotted 30 minutes for storing the episode, the playback device may be updated to store the final 20 minutes of the episode and 10 minutes of the subsequent episode. In other words, updating of episodes is not limited to an episode-by-episode basis.

Figure 7:
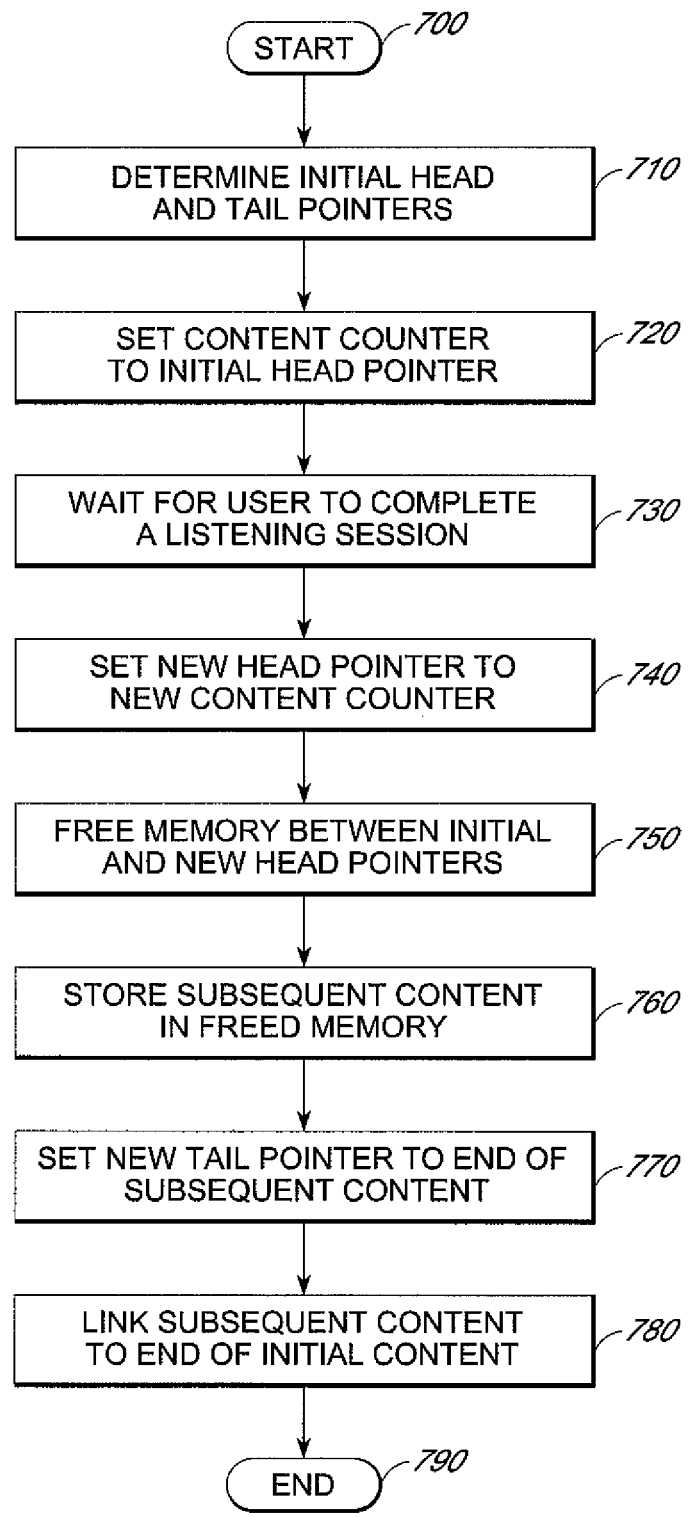
FIG. 7 is one embodiment of a flow diagram for automatically providing a seamless update until complete of audio content.

FIG. 7 is one embodiment of a flow diagram for automatically providing a seamless update until complete of audio content. The method of updating described with respect to FIG. 7 may be used, for example, when a listener is listening to an audio book. The listener may have stored on the playback device one hour of the audio book and may listen to 25 minutes of the audio book during a time period in which the playback device is separated from the library access device. When the listener couples the playback device to the library access device, the 25 minutes of the audio book immediately subsequent to the hour previously stored in the playback device is written over the 25 minute section previously listened to. The playback device then stores one hour of the audio book that the listener may listen to.

The method begins with step 700. In step 710 the playback device determines initial head and tail pointers of a particular audio content. The head pointer indicates the logical beginning of the audio content. Similarly, the tail pointer indicates the logical ending of the audio content. The logical beginning and ending of the audio content correspond to the beginning and ending, respectively, of the audio content if listened to "live." The audio content is not required to be stored in contiguous memory locations. In one embodiment, audio content is stored in multiple blocks of memory that are linked together to allow audio content stored in the memory blocks to be played back in proper audio sequence.

In step 720 a content counter is set to the initial head pointer. The content counter indicates the current memory location from which audio content is retrieved for playback. As audio content is played back, the content counter progresses through the audio content stored in memory in the proper audio sequence. In one embodiment, this is accomplished by stepping though memory blocks sequentially. When the end of a memory block is reached, a stored link that indicates the subsequent memory block is followed to the appropriate next memory block. That memory block is then stepped through sequentially to retrieve audio content. Of course, other memory arrangements may also be provided.

In step 730 the playback device waits for a user to complete a listening session. During the listening session, the content counter moves though memory as described above. During step 730, playback may be started and stopped multiple times. A listening session is defined as a time period during which the playback device is not coupled to the library access device, or other device that provides the playback device with audio content.

In step 740, when a listening session is complete, the head pointer is set to the content counter at the end of the listening session. This allows the subsequent listening session to begin at the point in the audio content where the most recent listening session ended. By updating the head pointer after each listening session, memory used for a particular audio selection may be treated as a circular queue such that used (played) audio content is replaced with unused (unplayed) audio content as the audio content is used rather than replacing a complete audio selection when the selection has been used.

In step 750, the memory storing the used audio content is freed and in step 760 the freed memory is used to store subsequent audio content from the library access device. When the new audio content is stored in the playback device, the tail pointer is set to the end of the new audio content in step 770. If the new audio content is placed in memory blocks other than those already used for the audio selection, the new memory blocks are linked to the existing audio content in step 780. The process completes in step 790.

Thus, an audio selection may be updated seamlessly such that the user may be unaware of memory limitations of the playback device. When the playback device is coupled to the library access device after a listening session, the used content in the playback device is replaced with new content from the library access device or other source.

Thus, a user may be provided with a mobile playback device that provides and updates audio according to the user's specifications. The user may specify an amount of time allocated for playback of one or more audio selections. The user may also specify a method for updating each of the audio selections. In this manner the user may personalize and time shift audio programming according to predetermined specifications.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A playback device comprising:
a memory to store a segment of a digital content; and
logic circuitry, coupled to the memory, to:
    maintain a head pointer identifying a logical beginning of the segment of the digital content in memory;
    maintain a content counter, wherein the counter is initially set to the head pointer of the segment of the digital content, and wherein the counter advances through corresponding positions within the segment of the digital content in memory during a rendering session;
    determine an unconsumed portion of the digital content to be placed within the memory based at least in part on a difference between a position of the head pointer and a position indicated by the content counter; and
    replace at least a consumed portion of the segment of the digital content with the determined unconsumed portion of the digital content.

2. The playback device of claim 1, wherein the consumed portion of the segment of the digital content is identified based at least in part on the difference between a position of the head pointer and a position of the content counter, and wherein the unconsumed portion of the digital content and the consumed portion of the segment of the digital content are of equal length.

3. The playback device of claim 1 further comprising an interface coupled to the memory, the interface to receive the unconsumed portion of the digital content from a remote source.

4. A method comprising:
    storing a segment of a digital content;
    maintaining a head pointer for the segment of the digital content that identifies a logical beginning of the segment of the digital content;
    maintaining a content counter, wherein said maintaining comprises:
        setting the content counter to the head pointer of the segment of the digital content to be rendered during a rendering session; and
        advancing the content counter through positions within the segment of the digital content during the rendering session;
    determining an unconsumed portion of the digital content based at least in part on a difference between a position of the head pointer and a position of the content counter; and
    replacing at least a consumed portion of the segment of the digital content with the determined unconsumed portion of the digital content.

5. The method of claim 4 further comprising:
    maintaining a tail pointer for the segment of the digital content that identifies a logical ending of the segment of the digital content.

6. The method of claim 4, wherein maintaining the content counter further comprises:
    setting the head pointer to a position identified by the content counter at an end of the rendering session.

7. The method of claim 4, wherein determining the unconsumed portion of the digital content comprises determining an unconsumed portion of the digital content of a substantially equal length to the consumed portion of the segment of the digital content, and wherein the consumed portion of the digital content is determined based at least in part on a difference between a position of the head pointer and a position of the content counter.

8. A method comprising:
    storing a segment of a digital content;
    maintaining a content counter for the segment of the digital content, wherein the content counter indicates a current location of consumption for the segment of the digital content;
    updating the content counters based on the consumption of the segment of the digital content;
    determining an unconsumed portion of the digital content based at least in part on a difference between a beginning of the segment of the digital content and a location indicated by the content counter; and
    replacing at least a consumed portion of the segment of the digital content with the determined unconsumed portion of the digital content.

9. The method of claim 8, wherein determining the unconsumed portion of the digital content comprises determining an unconsumed portion of the digital content of a substantially equal length to the consumed portion of the segment of the digital content.

10. A playback device comprising:
    a memory configured to store a segment of a digital content;
    logic circuitry coupled to the memory, the logic circuitry configured to:
        set a head pointer identifying a logical beginning and a tail pointer identifying a logical ending of the segment of the digital content;
        provide a content counter, wherein the content counter is initially set to the head pointer of the segment of the digital content and, wherein the content counter advances through corresponding positions within the segment of the digital content in memory during a consumption session;
        determine an unconsumed portion of the digital content based at least in part on a difference between a position of the head pointer and a position of the content counter; and
        replace at least a consumed portion of the segment of the digital content with the determined unconsumed portion of the digital content.

11. The playback device of claim 10 further comprising logic circuitry to update the head pointer to a position identified by the content counter at an end of the consumption session.

12. The playback device of claim 10, wherein the consumption session comprises rendering the digital content.

13. The playback device of claim 10, wherein the consumed portion of the segment of the digital content is indicated based at least in part by the difference between the position of the head pointer and the position of the content counter.

14. The playback device of claim 10, wherein the logic replaces the consumed portion of the segment of the digital content according to preferences of a user of the playback device.

15. The playback device of claim 10, wherein the consumption session ends when the playback device is turned off.

16. The playback device of claim 10, wherein the consumption session ends when rendering of the segment of the digital content is stopped.

17. The playback device of claim 10 further comprising logic to render the segment of the digital content.

18. The playback device of claim 10 further comprising logic circuitry to periodically update the head pointer to a position identified by the content counter during the consumption session.

19. The playback device of claim 18 further comprising logic circuitry that refers to the updated head pointer during a subsequent consumption session such that further consumption of the segment of the digital content begins at a point in the segment of the digital content designated by the updated head pointer.

20. A method for storing and playing electronic content on a playback device comprising:
    storing of segment of a digital content in memory;
    setting a head pointer identifying a logical beginning and a tail pointer identifying a logical ending of the segment of the digital content;
    providing a content counter, wherein the content counter is initially set to the head pointer of the segment of the digital selection and, wherein the content counter advances through corresponding positions within the segment of the digital content in memory during a consumption session,
    determining an unconsumed portion of the digital content based at least in part on a difference between a position of the head pointer and a position of the content counter; and
    replacing at least a consumed portion of the segment of the digital content with the determined unconsumed portion of the digital content.

21. The method of claim 20 further comprising updating the head pointer to a position identified by the content counter at an end of the consumption session.

22. The method of claim 21, wherein the end of the consumption session occurs when the playback device is turned off.

23. The method of claim 20 wherein the consumption session comprises rendering the segment of the digital content.

24. The method of claim 23, wherein the end of the consumption session occurs when the rendering of the segment of the digital content is stopped.

25. The method of claim 20, wherein the consumed portion of the segment of the digital content is indicated based at least in part by the difference between position of the head pointer and the position of the content counter.

26. The method of claim 25 wherein the consumed portion of the segment of the digital content is replaced at least in part according to the preferences of a user of the playback device.

27. The method of claim 20 further comprising periodically updating the head pointer to a position identified by the content counter during the consumption session.

28. The method of claim 27, further comprising referring to the updated head pointer during a subsequent consumption session such that further consumption of the segment of the digital content begins at a point in the segment of the digital content designated by the updated head pointer.

* * * * *

UNITED STATES PATENT AND TRADEMARK OFFICE
CERTIFICATE OF CORRECTION

PATENT NO. : 8,572,272 B2
APPLICATION NO. : 12/894735
DATED : October 29, 2013
INVENTOR(S) : Story et al.

It is certified that error appears in the above-identified patent and that said Letters Patent is hereby corrected as shown below:

On the Title Page

Page 1 (item 57, Abstract) at line 17, Change "used For" to --used. For--.

In column 2 (page 3, item 56) at line 32, Under Other Publications, change "Deman"," to --Demand",--.

In column 2 (page 3, item 56) at line 34, Under Other Publications, change "htlm," to --html,--.

In column 2 (page 3, item 56) at line 61, Under Other Publications, change "Feactures" to --Features--.

In the Specification

In column 1 at line 26, Change "(AIV)" to --(A/V)--.

In column 2 at line 42, Change "(NY)," to --(A/V),--.

In column 6 at line 17, Change "mayor" to --may or--.

In the Claims

In column 10 at line 31, In Claim 17, change "10further" to --10 further--.

In column 10 at line 45, In Claim 20, after "storing" insert --a--.

In column 10 at line 54, In Claim 20, change "session," to --session;--.

Signed and Sealed this
Twenty-first Day of October, 2014

Michelle K. Lee
*Deputy Director of the United States Patent and Trademark Office*